United States Patent
Seto

(10) Patent No.: US 10,579,356 B2
(45) Date of Patent: *Mar. 3, 2020

(54) SOFTWARE GLOBALIZATION OF DISTRIBUTED PACKAGES

(71) Applicant: International Business Machines Corporation, Armonk, NY (US)

(72) Inventor: Tetsuo Seto, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,802

(22) Filed: Nov. 7, 2018

(65) Prior Publication Data

US 2019/0073203 A1    Mar. 7, 2019

Related U.S. Application Data

(63) Continuation of application No. 15/422,003, filed on Feb. 1, 2017, now Pat. No. 10,169,020.

(51) Int. Cl.
| | |
|---|---|
| *G06F 8/60* | (2018.01) |
| *G06F 17/28* | (2006.01) |
| *G06F 9/451* | (2018.01) |
| *G06F 8/61* | (2018.01) |

(52) U.S. Cl.
CPC .............. *G06F 8/60* (2013.01); *G06F 9/454* (2018.02); *G06F 17/289* (2013.01); *G06F 17/2836* (2013.01); *G06F 8/61* (2013.01)

(58) Field of Classification Search
CPC ... G06F 8/60; G06F 8/61; G06F 9/454; G06F 17/2836; G06F 17/289

USPC ...................................... 717/168–178; 704/2
See application file for complete search history.

(56) References Cited

U.S. PATENT DOCUMENTS

| | | | |
|---|---|---|---|
| 5,297,279 | A | 3/1994 | Bannon et al. |
| 5,903,859 | A | 5/1999 | Stone et al. |
| 6,442,524 | B1 | 8/2002 | Ecker et al. |
| 9,262,135 | B2 | 2/2016 | Cheriton |
| 2002/0165885 | A1 | 11/2002 | Kumhyr et al. |
| 2003/0131320 | A1 | 7/2003 | Kumhyr et al. |
| 2006/0287844 | A1 | 12/2006 | Rich |
| 2013/0111460 | A1 | 5/2013 | Mohamed et al. |

(Continued)

OTHER PUBLICATIONS

Grace Period Disclosure: Tetsuo Seto, "strong-globalize", made publicly available online Feb. 4, 2016, 22 pages. https://github.com/strongloop/strong-globalize/blob/master/README.md.

(Continued)

*Primary Examiner* — Qing Chen
(74) *Attorney, Agent, or Firm* — Yee & Associates, P.C.

(57) ABSTRACT

A method, system, and computer program product for globalizing distributed software packages using a global API is disclosed. A text string in a source language is extracted from an independent package source code. An algorithm is used to calculate a resource message key for the text string. The resource message key and the text string are stored in a source language resource file. The text string is translated into an additional language to create a translated text string. The translated text string is stored with the resource message key in an additional language resource file. The independent package is distributed with the source language resource file, the additional language resource file, and the independent package program code bundled in the independent package.

10 Claims, 10 Drawing Sheets

(56) References Cited

U.S. PATENT DOCUMENTS

2015/0081269 A1     3/2015   Phadke
2015/0324353 A1    11/2015   Wu et al.

OTHER PUBLICATIONS

"About Swift", Apple, Inc., updated Oct. 27, 2016, 1 page. https://developer.apple.com/library/content/documentation/Swift/Conceptual/Swift_Programming_Language/.
"Globalize: A JavaScript library for internationalization and localization that leverages the official Unicode CLDR JSON data," npm, Inc., copyright 2017, 14 pages. https://www.npmjs.com/package/globalize.
"Go Package Manager", GitHub, Inc., Jul. 8, 2016, 2 pages. https://github.com/gpmgo/gopm.
"Gopm Registry", Go Package Manager, copyright 2015, 3 pages. https://gopm.io/.
"Swift Package Manager," Apple, Inc., copyright 2017, 9 pages. https://swift.org/package-manager/#conceptual-overview.
"Unicode CLDR Project," Unicode, Inc., copyright 1991-2017, 5 pages. http://cldr.unicode.org/.
DeBill, "Module Counts," updated May 30, 2016, 2 pages. http://www.modulecounts.com/#.

SOFTWARE GLOBALIZATION OF DISTRIBUTED PACKAGES

CROSS-REFERENCE TO RELATED APPLICATION(S)

This application is a continuation of U.S. patent application Ser. No. 15/422,003 (now U.S. Pat. No. 10,169,020), filing date Feb. 1, 2017, the entire contents of which are incorporated herein by reference.

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE: Tetsuo SETO, "strong-globalize", made publicly available online Feb. 4, 2016, 22 pages.

BACKGROUND

1. Field

The disclosure relates generally to methods and systems for globalizing distributed software packages, and more particularly to replacing text strings in a source language with a translation in another language at runtime.

2. Description of the Related Art

Software may be made up of a number of replaceable packages that are developed in a distributed process. Globalization of distributed software packages may require translation of a human language text strings in one language into one or more additional languages.

In the modular and distributed development environment such translation data is maintained in a central or separate repository. Version mismatch issues may arise between the source code and the translation data. In addition, applications created in the modular and distributed development environment may contain packages both under the control of the developer after publication and packages that will not be under the control of the developer after publication. For example, text strings appearing in the application and subject to translation may not appear on a user's web site with translations that the original developer would have approved as a change had been made in a package not under the control of the developer after publication.

SUMMARY

According to one illustrative embodiment, a method for globalizing distributed software packages using a global API is disclosed. A text string in a source language is extracted from an independent package source code. An algorithm is used to calculate a resource message key for the text string. The resource message key and the text string are stored in a source language resource file. The text string is translated into an additional language to create a translated text string. The translated text string is stored with the resource message key in an additional language resource file. The independent package is distributed with the source language resource file, the additional language resource file, and the independent package program code bundled in the independent package.

DETAILED DESCRIPTION

Figure 1:
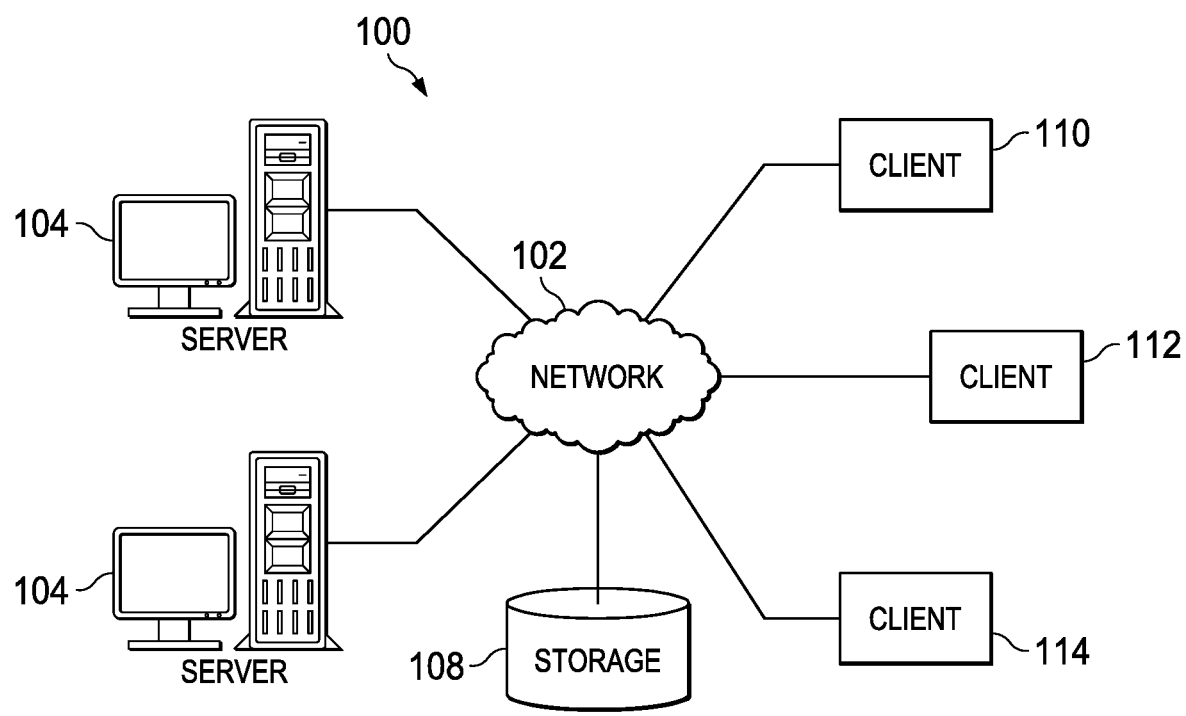
FIG. 1 is a pictorial representation of a network of data processing systems in which illustrative embodiments may be implemented.

Different developers in different countries with different languages may prepare software modules using a global API so that the software modules may be combined and modified with uniform translation across all modules without affecting the distributed development.

An enterprise-scale builder may need to consolidate modular packages that have been independently developed, some open source and some internal, and to consistently translate and localize the modular packages and distribute a resulting application to a global market. A global application programming interface (API) may be used to create globalized source code from the first draft of an application, through final development and distribution. The global API may be used to translate distributed packages in a consistent way without loss of flexibility and value provided by a distributed development environment.

A common application programming interface may allow different developers in different countries with different languages to prepare software modules that can be combined and modified with uniform translation across all modules without affecting the distributed development. The global API may provide for globalization of independently developed modules regardless of whether the module was developed using open source or internally developed. As used herein globalization means uniform and consistent translation across all packages using a global API.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1 through 11, diagrams of data processing environments are provided in which illustrative embodiments may be implemented. It should be appreciated that FIGS. 1 through 11 are only meant as examples and are not intended to assert or imply any limitation with regard to the environments in which different embodiments may be implemented. Many modifications to the depicted environments may be made.

FIG. 1 depicts a pictorial representation of a network of data processing systems in which an illustrative embodiment may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a customer workload after failure of a primary computing environment executing the customer workload. The failed primary computing environment may be, for example, a server or a set of servers in a data center environment or a cloud environment. Server 104 or server 106 also may generate a secondary virtual machine seed image storage at a secondary data processing site for the failure recovery. The configuration of the secondary data processing site is similar to the configuration of the primary data processing site.

Client 110, client 112, and client 114 also connect to network 102. Clients 110, 112, and 114 are clients of server 104 and/or server 106. Server 104 and server 106 may provide information, such as boot files, operating system images, virtual machine images, and software applications to clients 110, 112, and 114.

In this example, clients 110, 112, and 114 may each represent a different computing environment. A computing environment includes physical and software resources used to execute a set of one or more customer workloads or tasks. A computing environment may comprise, for example, one server, a rack of servers, a cluster of servers, such as a data center, a cloud of computers, such as a private cloud, a public cloud, a hybrid cloud, or any combination thereof. In addition, each of clients 110, 112, and 114 may be a primary data processing site or a secondary data processing site. A primary data processing site initially executes a customer workload using a set of primary virtual machines and images. A secondary data processing site executes the customer workload using a set of secondary virtual machines and seed images when one or more primary virtual machines fail while processing the customer workload at the primary data processing site.

Storage 108 is a network storage device capable of storing any type of data in a structured format or an unstructured format. The type of data stored in storage 108 may be, for example, a list of computing environments with corresponding available resources, a list of primary data processing sites, a list of secondary data processing sites, a list of customer workloads, a plurality of virtual machine images, and the like. Further, storage 108 may store other types of data, such as authentication or credential data that may include user names, passwords, or biometric data associated with system administrators, for example.

In addition, it should be noted that network data processing system 100 may include any number of additional servers, clients, storage devices, and other devices not shown. Program code located in network data processing system 100 may be stored on a computer-readable storage medium and downloaded to a computer or other data processing device for use. For example, program code may be stored on a computer-readable storage medium on server 104 and downloaded to client 110 over network 102 for use by client 110.

In the depicted example, network data processing system 100 may be implemented as a number of different types of communication networks, such as, for example, an internet, an intranet, a local area network (LAN), or a wide area network (WAN). FIG. 1 is intended as an example only, and not as an architectural limitation for the different illustrative embodiments.

Figure 2:
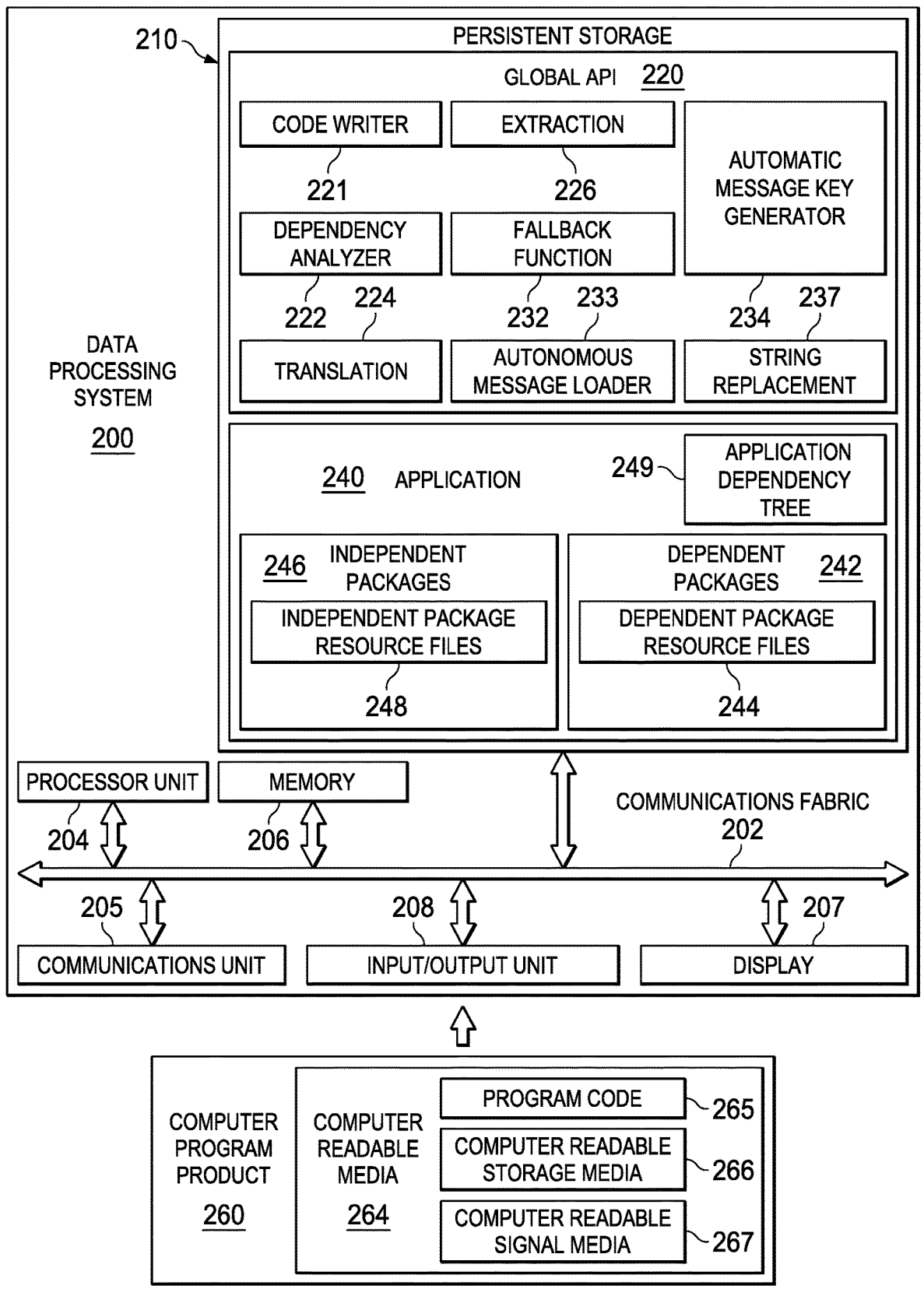
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 210, communications unit 205, input/output (I/O) unit 208 and display 207.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 210 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 210 may take various forms, depending on the particular implementation. For example, persistent storage 210 may contain one or more devices. For example, persistent storage 210 may be a hard drive, a flash memory, a rewritable optical disk, a rewritable magnetic tape, or some combination of the above. The media used by persistent storage 210 may be removable. For example, a removable hard drive may be used for persistent storage 210.

In this example, persistent storage 210 stores global API 220, components of global API 220, and application 240. All components of global API 220 may be designed to work with Nodejs, JavaScript, GOLang, Swift, and any other computer language known to persons skilled in the art.

Code writer 221 may be a component of global API 220 and may be any suitable language for writing statements that may be translated by a compiler into machine language. Global API 220 may operate to globalize code from any number of computer languages and may use code writer 221 for creation of original globalized code. Code writer 221 may be the code writer of any developer using global API 220 in order to create globalized software packages and applications.

Dependency analyzer 222 is a component of global API 220. Dependency analyzer 222 may examines an application to determine dependencies of modular packages of software code in an application. Dependency analyzer 222 may parse a dependency tree of application packages such as application dependency tree 249 of application 240 and identify an independent package and also those packages having respective dependencies from the independent package. Independent package may be independent package 246 of application 240. Dependent packages may be dependent packages 242 of application 240.

Translation 224 is a component of global API 220 that may be any tool for translating a human string text in one language into one or more other languages. Translation 224 may access any automated translation program or translation service. In an illustrative embodiment, the translation service may be IBM Globalization Pipeline on Bluemix (GPB). GPB provides a service to machine-translate human string text. Translation 224 may be configured to perform for any language and may perform either machine translation or manual translation.

Figure 3:
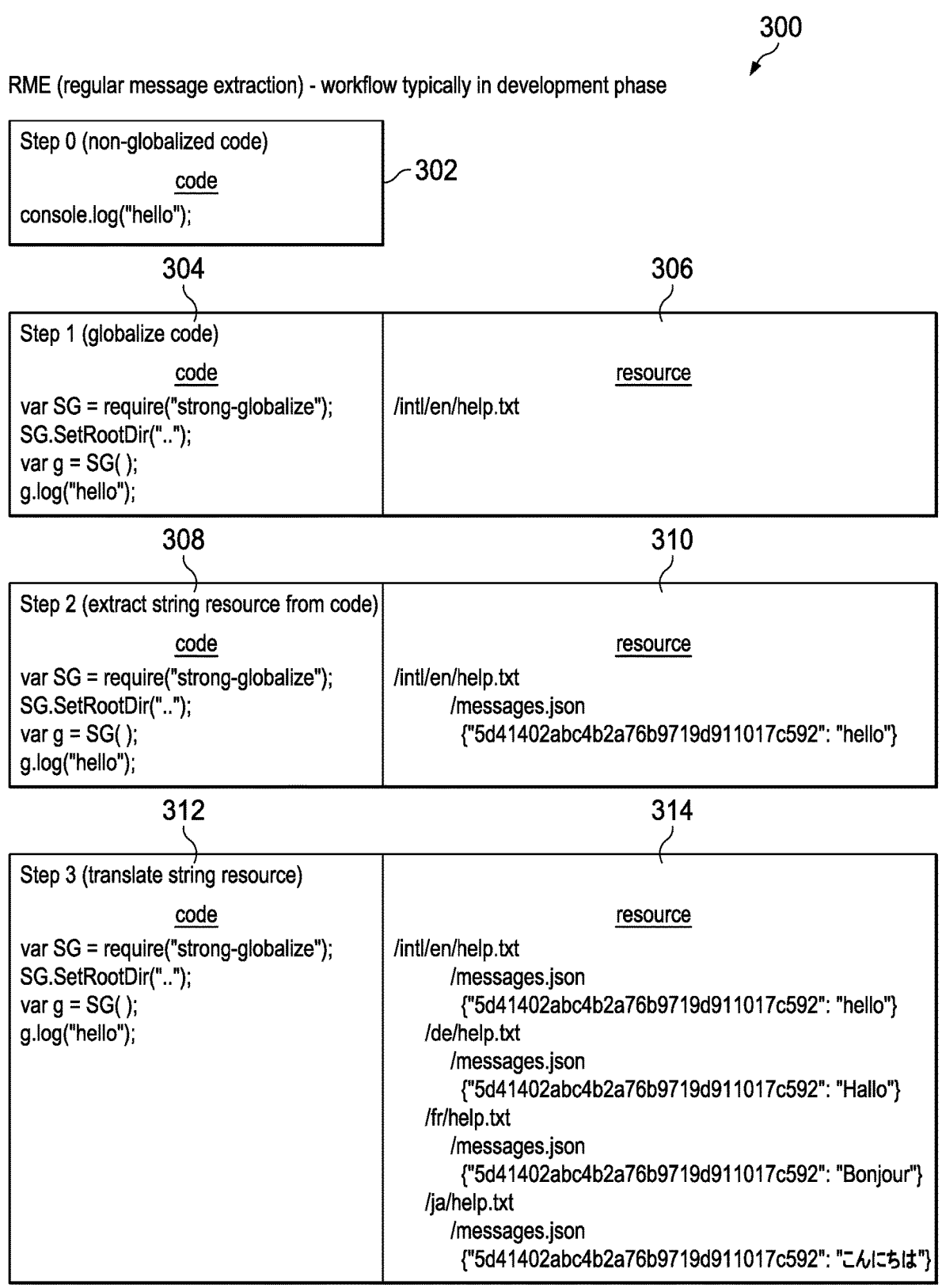
FIG. 3 depicts an illustrative example of regular message extraction in accordance with an illustrative embodiment.
Figure 4:
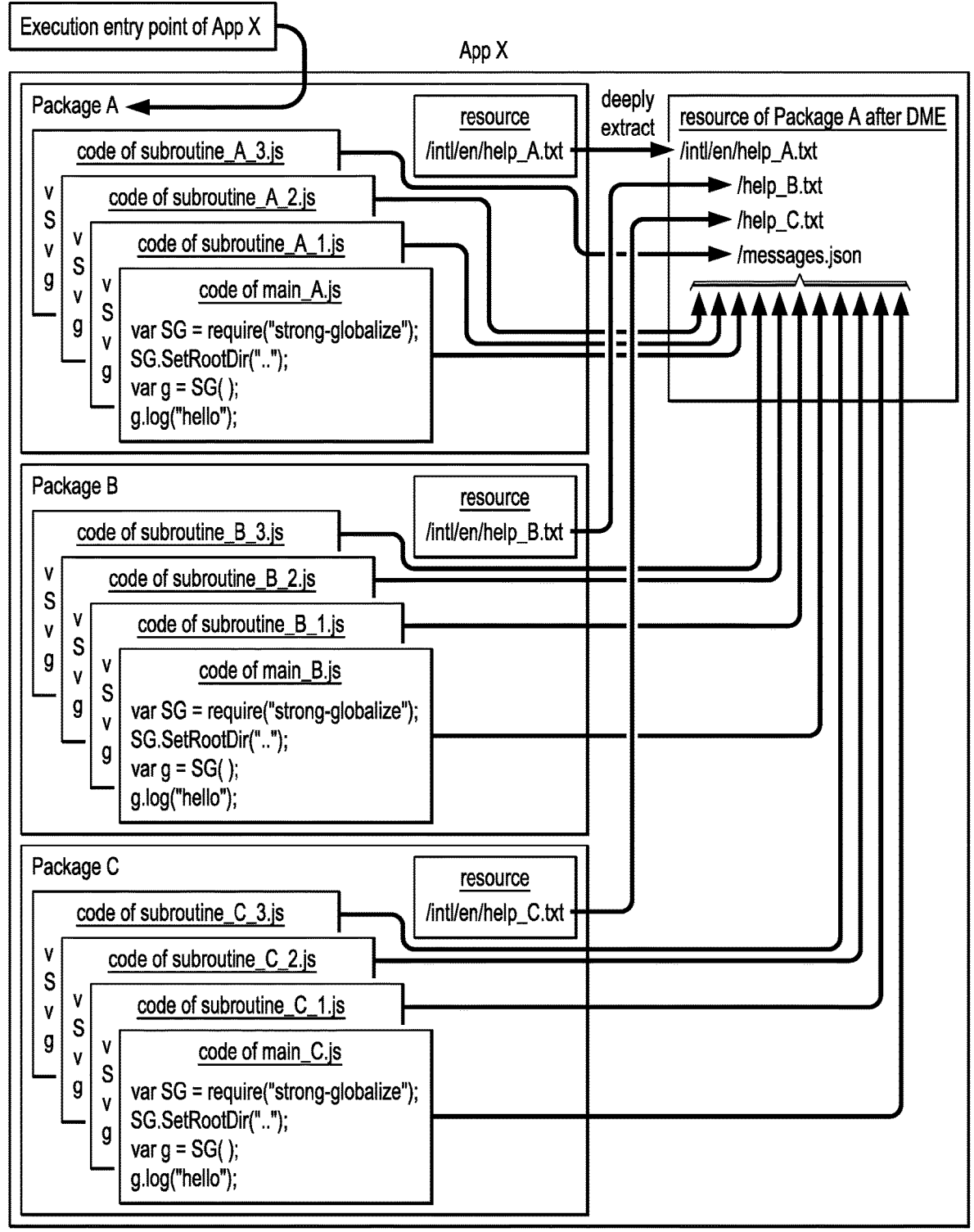
FIG. 4 depicts an illustrative example of deep message extraction in accordance with an illustrative embodiment.
Figure 5:
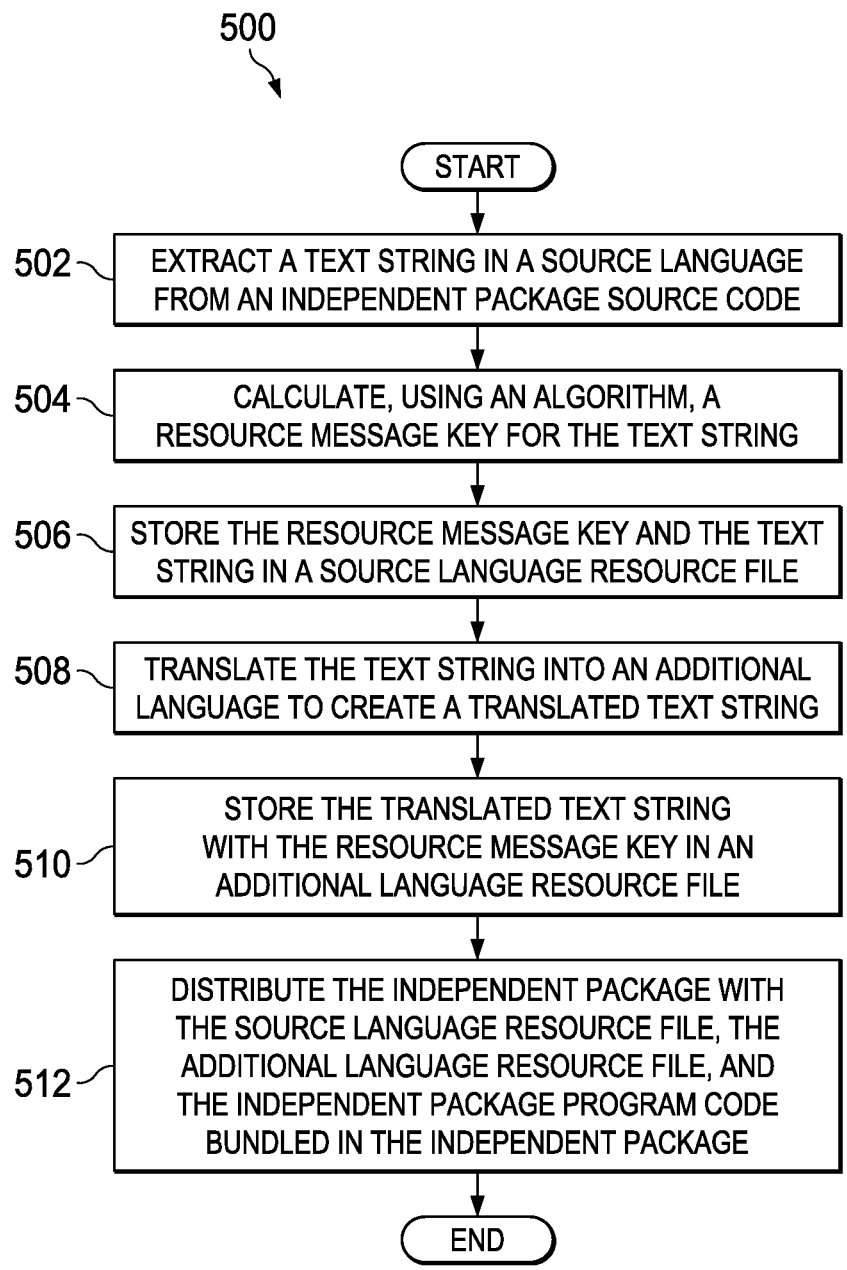
FIG. 5 depicts a flowchart for a process for regular extraction in an independent modular software package in accordance with an illustrative embodiment.
Figure 6:
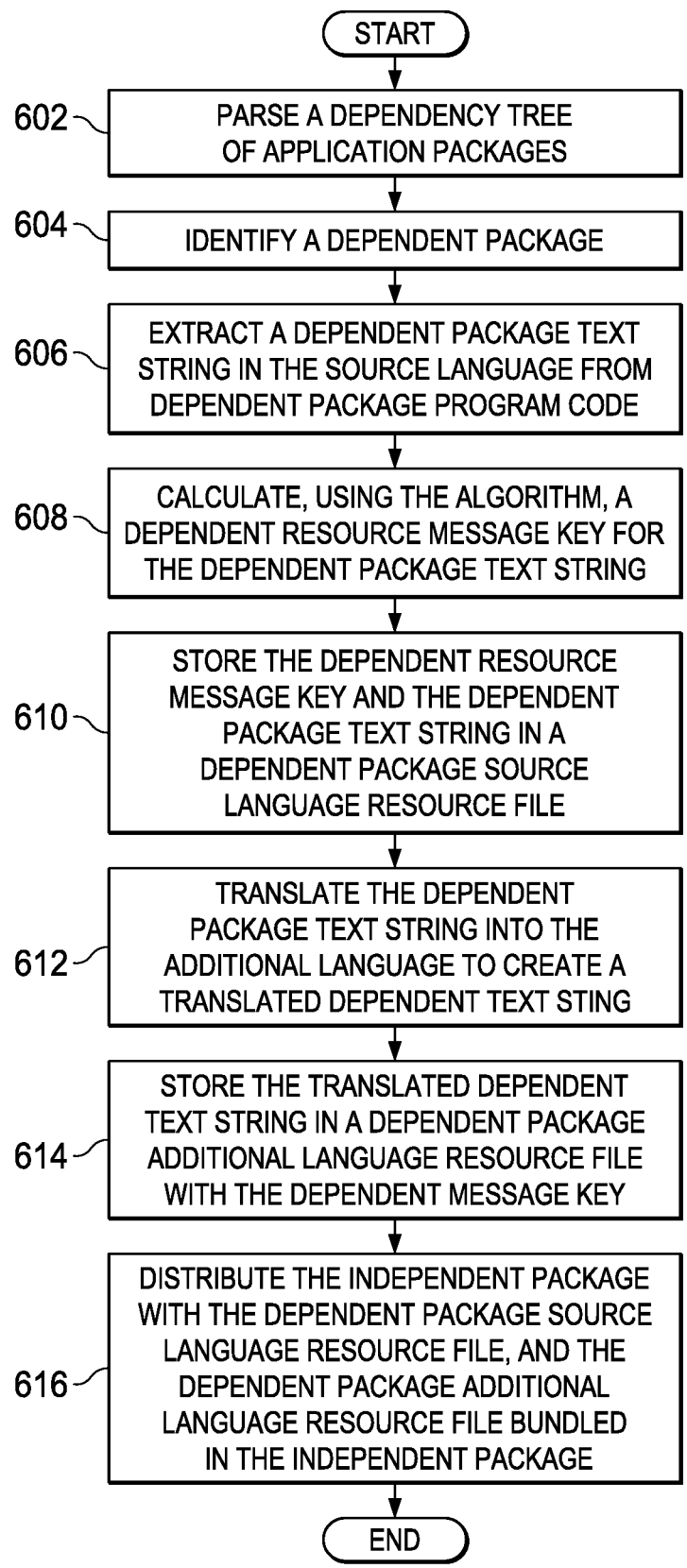
FIG. 6 depicts a flowchart for a process for deep message extraction is a dependent modular software package in accordance with an illustrative embodiment.
Figure 11:
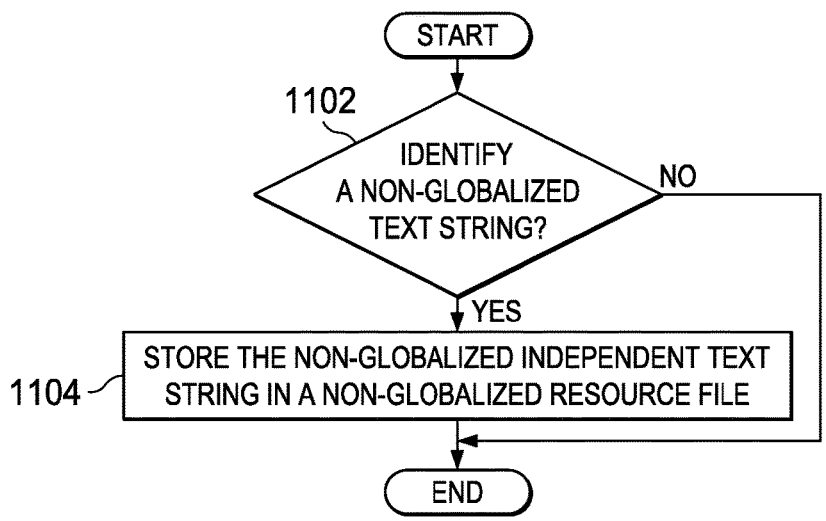
FIG. 11 depicts a flowchart for an exhaustive extraction in accordance with an illustrative embodiment.

Extraction 226 is a component of global API 220 that parses the modular packages of software written for an application using global API 220 to identify human language text strings. Extraction 226 extracts the human language text strings from the modular packages and places them in a resource file. Extraction 226 may perform regular extraction or deep extraction. Regular extraction may be performed on independent packages. An illustrative example of regular extraction is shown in FIG. 3. An illustrative example of the process for regular extraction is shown in FIG. 5. Deep extraction may be performed on independent packages using a dependency tree such as application dependency tree 249. An illustrative example of deep extraction is shown in FIG. 4. An illustrative example of the process of deep extraction is shown in FIG. 6. Furthermore extraction 226 may perform exhaustive extraction. Exhaustive extraction identifies non-globalized text strings. An illustrative example of the process of exhaustive extraction is shown in FIG. 11.

Figure 10:
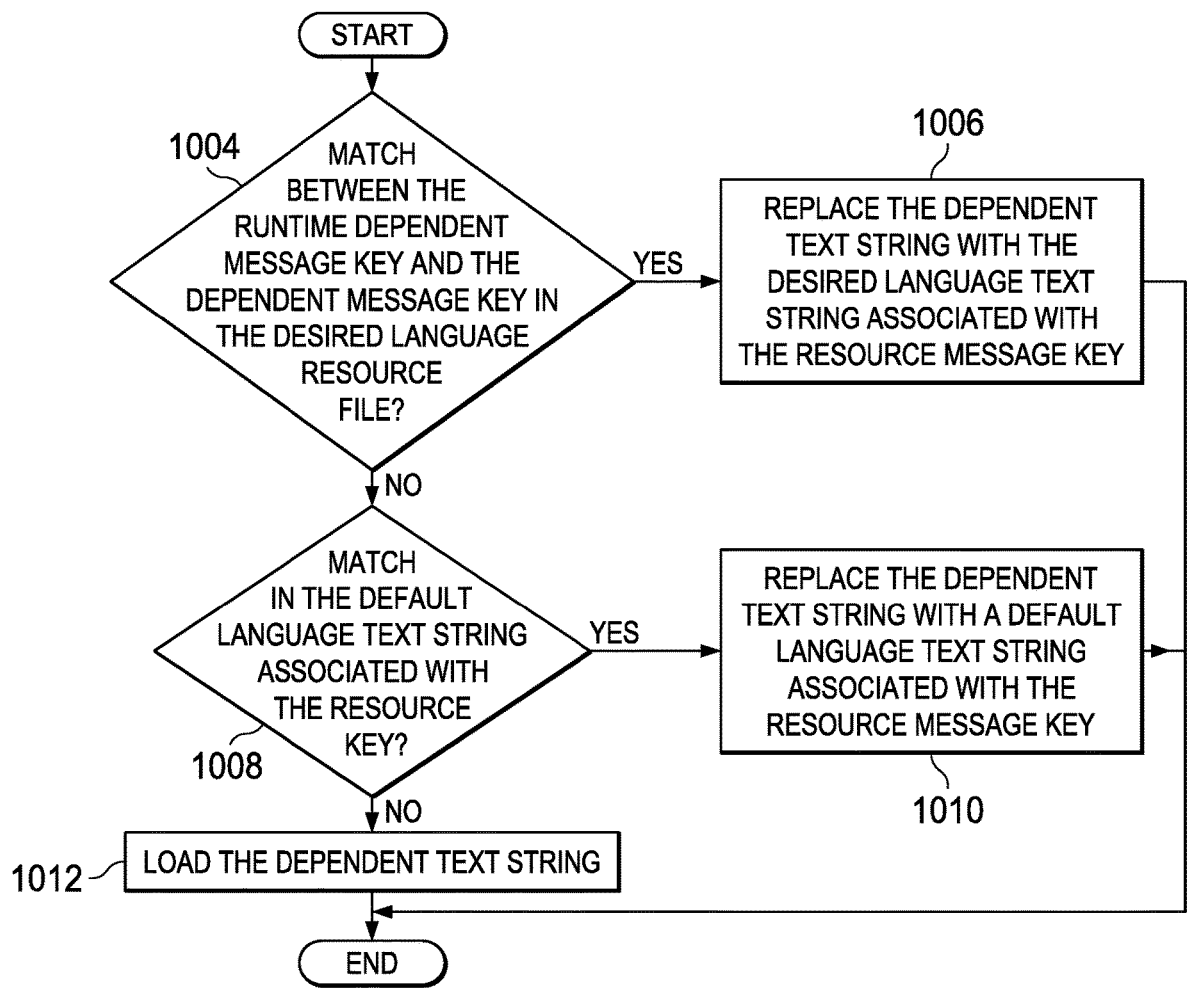
FIG. 10 depicts a flowchart for a runtime process for a fallback function in an application with globalized modular software packages in accordance with an illustrative embodiment.

Fallback function 232 is a component of global API 220 that may be employed for an application written using Global API 220. Fallback function 232 provides a three level fallback routine. The first level is the desired language, the second is the default language, and the third is whatever language used in the text string embedded in the program source code which may vary from package to package. An illustrative example of a process of fallback function 232 is shown in FIG. 10.

Figure 9:
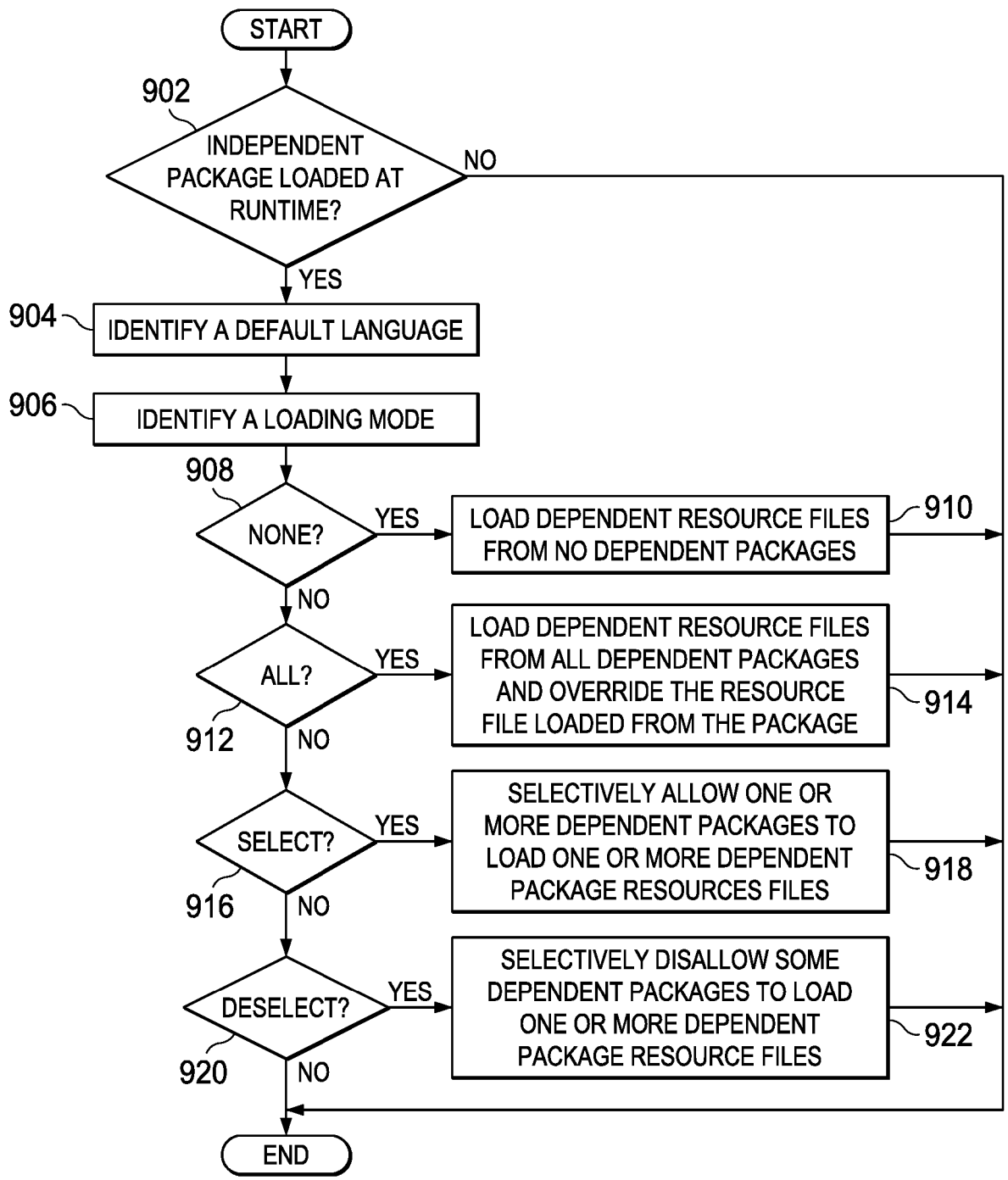
FIG. 9 depicts a flowchart for a runtime process for an autonomous message loader for an application with globalized modular software packages in accordance with an illustrative embodiment.

Autonomous message loader 233 is a component of global API 220 that allows a developer to designate a default language. Autonomous message loader 223 also permits a developer using global API 220 to select one of four loading options. First, autonomous message loader 233 may not load dependent resource files from any dependent packages. Second, autonomous message loader 233 may load dependent resource files from all dependent packages and override the resource file loaded from the package. Third, autonomous message loader 233 may selectively allow one or more dependent packages to load one or more dependent package resources files. Fourth, Autonomous message loader 233 may selectively disallow some dependent packages to load the dependent package resource files from the disallowed dependent packages. An illustrative example of a process of autonomous message loader 233 is shown in FIG. 9.

Automatic message key generator 234 is a component of Global API 220 that calculates a message key for each human text string extracted by extraction 226. In an illustrative embodiment, the message key is a hash code calculated from the content of an extracted human text string such as the algorithm of step 504 in FIG. 5. Moreover, the algorithm of step 504 in FIG. 5 is the same as the algorithm of step 608 in FIG. 6. Automatic message key generator always uses the same message key algorithm in an application so that all message keys for a text string will be identical, whether calculated before distribution or calculated at runtime after distribution. In FIGS. 5 through 8 each reference to an algorithm is to the same algorithm that will produce an identical hash code for an extracted text string in a source language from an independent or a dependent package.

String replacement 237 is a component of Global API 220 that replaces strings in the modular packages with strings translated by translation 224. String replacement 237 may determine whether a message key associated with a text string matches a message key associated with a translated text string, the translated text string being a translation of the text string. When a match is found, string replacement 237 may replace the string with the matching translated string. String replacement 237 does not replace the actual source code of the text string. String replacement 237 sends the translated string to a caller so that the caller sees the translated text.

Manual message key generator 230 is a component of Global API 220 that enables a developer to create a manual message key. A manual message key may be employed when a translation may have more than one correct translation, when a word in one language may require two words for a translation in another language, and vice versa, or when there are two occurrences of a text string in a source language and each has a different translation due to context, nuance, or localization.

Application 240 contains independent packages 246 and dependent packages 242. Independent packages 246 contain independent package resource files 248. An application consists of one or more packages, one of which is the independent package, and each package consists of program code (usually, one or more program files) and resource files. Every package can call one of the global API that defines the elements. But, only the definition implemented in the independent package takes effect. In an illustrative example, the independent package selection is done in runtime as follows. When the operating system such as Nodejs loads the application into memory, the operating system loads each package. In that loading order, the package loaded into the memory first is the independent package. Generally speaking, every package can be designed to work as either independent package or dependent package. Whether it becomes the independent package or not is determined in runtime based on how the application statically configured and how the application is started by the operating system following the user command. FIG. 4 provides an illustrative example of both independent and dependent packages. Illustrative examples of independent package resource files may be resource files 306, 310, and 314 in FIG. 3. Dependent packages 242 contain dependent package resource files 244. Illustrative examples of dependent packages may be package A and package B in FIG. 4.

Communications unit 205, in this example, provides for communication with other computers, data processing systems, and devices via a network, such as network 102 in FIG. 1. Communications unit 205 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 208 allows for the input and output of data with other devices that may be connected to data processing system 200. For example, input/output unit 208 may provide a connection for user input through a keypad, a keyboard, a mouse, and/or some other suitable input device. Display 207 provides a mechanism to display information to a user and may include touch screen capabilities to allow the user to make on-screen selections through user interfaces or input data, for example.

Instructions for the operating system, applications, and/or programs may be located in persistent storage 210, which is in communication with processor unit 204 through communications fabric 202. In this illustrative example, the instructions are in a functional form on persistent storage 210. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 210.

Program code 265 is located in a functional form on computer readable media 264 that is selectively removable and may be loaded onto or transferred to data processing system 200 for running by processor unit 204. Program code 265 and computer readable media 264 form computer program product 260. In one example, computer readable media 264 may be computer readable storage media 266 or computer readable signal media 267. Computer readable storage media 266 may include, for example, an optical or magnetic disc that is inserted or placed into a drive or other device that is part of persistent storage 210 for transfer onto a storage device, such as a hard drive, that is part of persistent storage 210. Computer readable storage media 266 also may take the form of a persistent storage, such as a hard drive, a thumb drive, or a flash memory that is connected to data processing system 200. In some instances, computer readable storage media 266 may not be removable from data processing system 200.

Alternatively, program code 265 may be transferred to data processing system 200 using computer readable signal media 267. Computer readable signal media 267 may be, for example, a propagated data signal containing program code 265. For example, computer readable signal media 267 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 265 may be downloaded over a network to persistent storage 210 from another device or data processing system through computer readable signal media 267 for use within data processing system 200. For instance, program code stored in a computer readable storage media in a data processing system may be downloaded over a network from the data processing system to data processing system 200. The data processing system providing program code 265 may be a server computer, a client computer, or some other device capable of storing and transmitting program code 265.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 210, and computer readable storage media 266 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

FIG. 3 depicts an illustrative example of regular message extraction in accordance with an illustrative embodiment. In FIG. 3, English is the source language. However, global API 220 of FIG. 2 may be employed with any language as the source language. Translation may be performed by human or machine translation using translation 224. Message files such as messages.json may include manually defined message strings. Three steps are illustrated for regular message extraction. Step "0" 302 is an example of non-globalized code; console.log("hello"). Step "1" 304 globalizes the code and creates resource file 306. Step "2" 308 extracts string from the code and places the string into the resource file 310. A message key is placed before the string. Step "3" 312 translates the string resource in the resource file 314. Each translation of the string has the same message key. In the illustrative example, translations into German (de), French (fr) and Japanese (ja) are shown. All are located in the resource files under/intl/directory.

FIG. 4 depicts an illustrative example of deep message extraction in accordance with an illustrative embodiment. Deep message extraction may be performed on dependent packages. In the illustrative example of FIG. 4, deep message extraction is performed by extracting the message strings from all the packages in App X and storing all the message strings in messages.json of Package A. The deep message extraction takes place after integrating all the dependencies of Package A, which is the independent and top-level package of App X. Translation of App X is performed by translating Package A after deep message extraction. In the illustrative example, each package may include en/messages.json, but deep message extraction scans the source code of each source file in every package to extract literal strings. If messagejson exists in a dependent package such as Package C, deep message extraction examines the contents of the messagejson and if a manually defined message strings exist, the manually defined message is deeply-extracted. In the event that there is a package that is not globalized at all, the regular message extraction of FIG. 3 and the deep message extraction of FIG. 4 may be combined with an exhaustive mode. When exhaustive mode is combined with regular message extraction and deep message extraction, global API 220 extracts all literal strings in extraction off line.

Typically, the source language of the independent package and the source language of the dependent package are the same. However, they can be different. Whatever language used for the text strings in the package source code is the source language. In a package, once the translation is done and translated strings are stored in a corresponding resource file, one cannot distinguish which language was the source language. Thus, in any language, if the strings used to calculate the message key and the algorithm are consistent between the offline extraction and runtime, the replacement will occur.

FIG. 5 depicts a flowchart for a process to for regular message extraction in an independent modular software package in accordance with an illustrative embodiment. FIG. 5 is an illustrative example of the process of regular message extraction performed by extraction 226 of global API 220 in FIG. 2. Process 500 begins. A text string in a source language is extracted from an independent package source code (step 502). The independent package may be an independent package in independent packages 246 in FIG. 2. Using an algorithm, a resource message key is calculated for the text string (step 504). The same algorithm is used in FIGS. 5-8. The dependent resource message key may be calculated by automatic message key generator 234 in FIG. 2. The resource message key and the text string are stored in a source language resource file (step 506). The text string is translated into an additional language to create a translated text string (step 508). Translation may be performed by translation 224 in FIG. 2. The translated text string with the resource message key is stored in an additional language resource file (step 510). The independent package is distributed with the source language resource file, the additional language resource file, and the independent package program code bundled in the independent package (step 512). Process 500 ends.

FIG. 6 depicts a flowchart for a process for deep extraction in a dependent modular software package in accordance with an illustrative embodiment. Process 600 is an illustrative example of a process of deep extraction performed by extraction 226 of global API 220 in FIG. 2. Process 600 starts. A dependency tree of application packages is parsed (step 602). An application may be application 240 in FIG. 2. Parsing may be performed by dependency analyzer 222 in FIG. 2. Dependency analyzer 222 may parse application dependency tree 249 in FIG. 2. A dependent package is identified (step 604). The dependent package may be one of dependent packages 242 in FIG. 2. A dependent package text string in the source language is extracted from dependent package program code (step 606). Using the algorithm, a dependent resource message key for the dependent package text string is calculated (step 608). The same algorithm is used in FIG. 5 through FIG. 8. The dependent resource message key may be calculated by automatic message key generator 234 in FIG. 2. The dependent resource message key and the dependent package text string are stored in a dependent package source language resource file (step 610). The dependent package text string is translated into the additional language to create a translated dependent text string (step 612). Translation may be performed by translation 224 in FIG. 2. The translated dependent text string is stored in a dependent package additional language resource file with the dependent message key (step 614). The independent package is distributed with the dependent package source language resource file, and the dependent package additional language resource file bundled in the independent package (step 616). The independent package may be the independent package of FIG. 5. Process 600 ends.

In runtime there is no distinction between a source language resource file and the additional language resource file. The hashing algorithm generates unique message keys such as unique hash codes, from the text embedded in the package program code.

Figure 7:
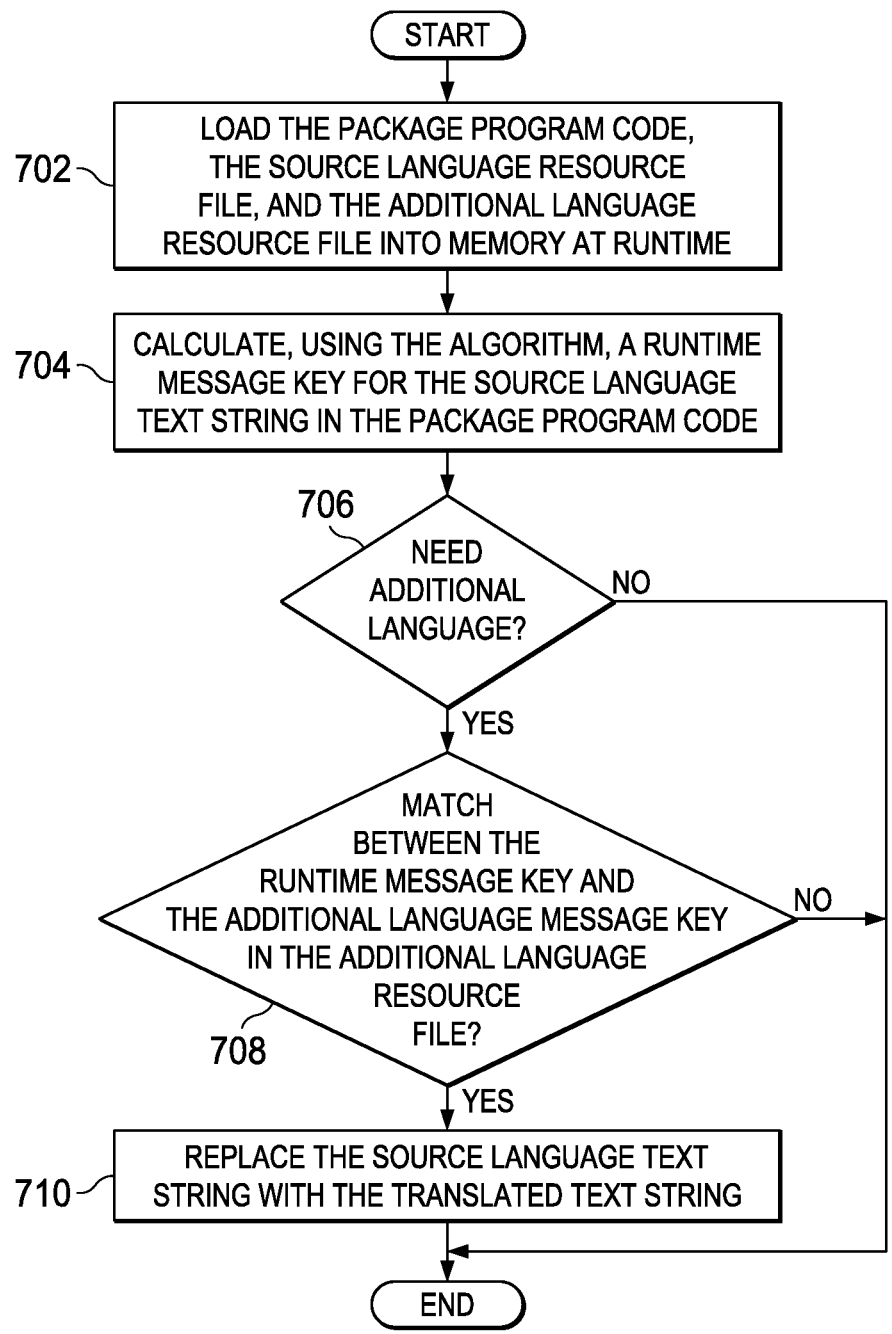
FIG. 7 depicts a flowchart for a runtime process for returning an additional language to a caller of the global API from a globalized independent modular software package in accordance with an illustrative embodiment.

FIG. 7 depicts a flowchart for returning an additional language to a caller of the global API from a globalized independent modular software package in accordance with an illustrative embodiment. Process 700 starts. The package program code, the source language resource file, and the additional language resource file are loaded into memory at runtime (step 702). The package program code, the source language resource file, and the additional language resource file may be the independent package program code, the source language resource file, and the additional language resource file step 512 in FIG. 5. Using the algorithm, a runtime message key for the source language text string in the package program code is calculated (step 704). The same algorithm is used in FIG. 5 through FIG. 8. A determination is made that a desired language is the additional language (step 706). A desired language may be a language requested by a caller of the global API. A determination is made whether a match exists between the runtime message key and the additional language message key in the additional language resource file (step 708). Responsive to finding the match, the source language text string is replaced with the translated text string (step 710). Replacement may be performed by string replacement 237 of global API 220 in FIG. 2. Process 700 ends.

Figure 8:
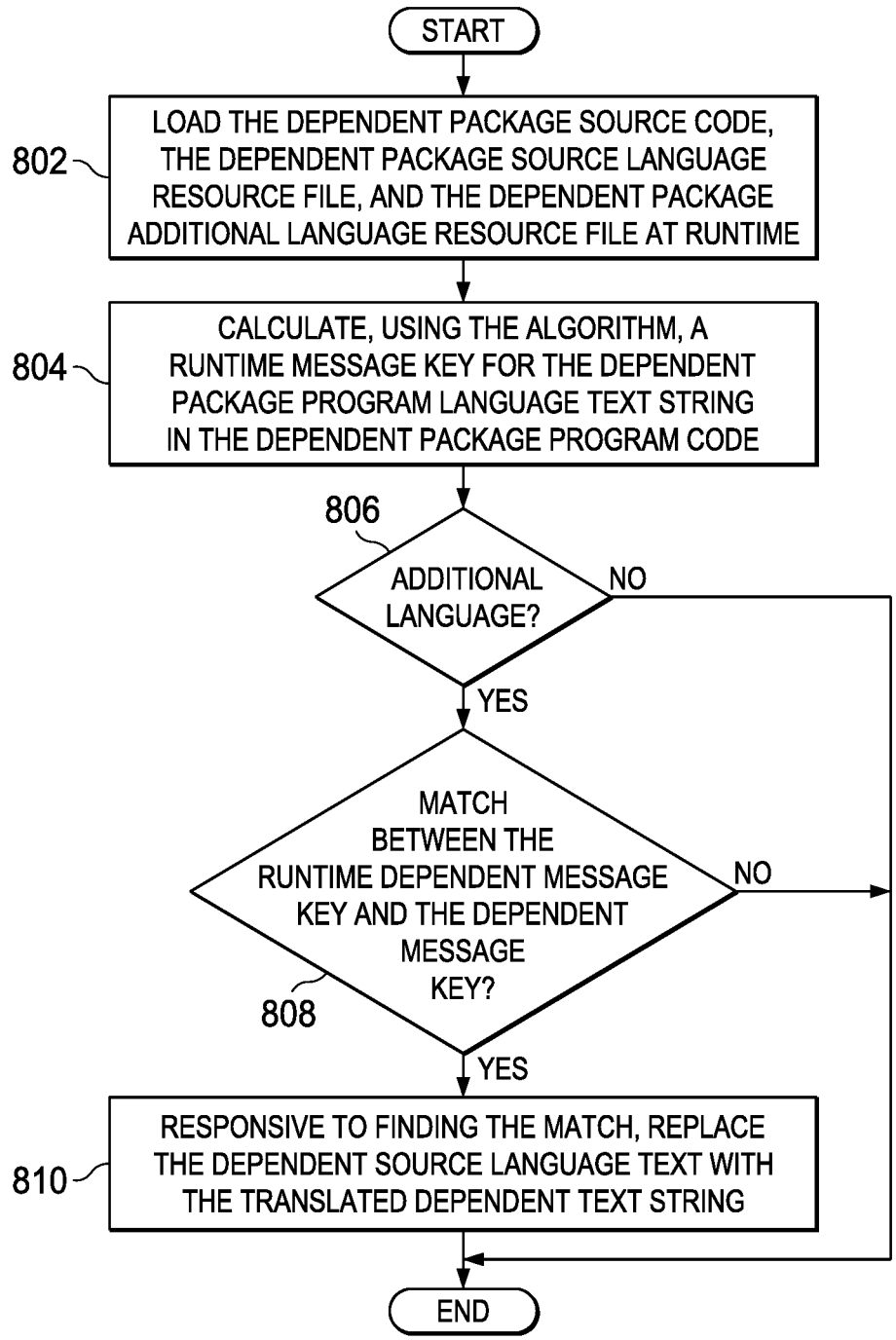
FIG. 8 depicts a flowchart for a runtime process for returning an additional language to a caller of the global API from a globalized dependent modular software package in accordance with an illustrative embodiment.

FIG. 8 depicts a flowchart for returning an additional language to a caller of the global API from a globalized dependent modular software packages in accordance with an illustrative embodiment. Process 800 starts. The dependent package source code, the dependent package source language resource file, and the dependent package additional language resource file are loaded at runtime (step 802). The dependent package source language resource file, and the dependent package additional language resource file may be the dependent package source language resource file, and the dependent package additional language resource file of step 616 in FIG. 6. Using the algorithm, a runtime message key for the dependent package program language text string in the dependent package program code is calculated (step 804). The same algorithm is used in FIG. 5 through FIG. 8. A determination is made, at runtime, that a desired language is the additional language (step 806). A desired language may be a language requested by a caller of the global API. A determination is made whether a match exists between the runtime dependent message key and the dependent message key (step 808). In an illustrative example, the dependent message key may be associated with a translated dependent text string in an additional language resource file of an independent package such as illustrated in step 616 of FIG. 6. Responsive to finding the match, the dependent source language text is replaced with the translated dependent text string (step 810). Replacement may be performed by string replacement 237 of global API 220 in FIG. 2. Process 800 ends.

FIG. 9 depicts a flowchart for a runtime process for an autonomous message loader in an application with globalized modular software packages in accordance with an illustrative embodiment. Autonomous message loader may be autonomous message loader 233 in FIG. 2. Process 900 starts. A determination is made that an independent package has been loaded at runtime (step 902). If an independent package has been loaded, a default language is identified (step 904). A loading mode is identified (step 906). A determination is made whether "none" has been identified as the loading mode (step 906). If "none" has been identified, then dependent resource files from no dependent packages are loaded (no action is taken) (step 910) and process 900 ends. If "none" has not been identified, then a determination is made if "all" has been identified (step 912). If "all" has been identified, then dependent resource files from all dependent packages are loaded and the resource file loaded from the package is overwritten (step 914) and process 900 ends. If "all" has not been identified, a determination is made if "select" has been identified (step 916). If "select" has been identified, one or more dependent packages are selectively allowed to load one or more dependent package resources files (step 918) and process 900 ends. If a determination is made that "select" has not been identified, then a determination is made if "deselect" has been identified (step 920). If "deselect" has been identified, then some dependent packages are selectively disallowed to load one or more dependent package resource files (step 922) and process 900 ends. If "deselect" has not been identified then process 900 ends.

The autonomous message loader is independent of the extractor that performs regular and deep extraction. When deep extraction is not used to extract text strings into the resource file of the independent package, the independent package may use the load all option. Even when deep extraction is used, the independent package may use the load all option.

The independent package selection mechanism is similar to the selection of queen bee. In a hive, there may be multiple bees (analogous to software packages). The multiple bees may be designed to become the queen of the hive by being given special food or a "royal jelly" (analogous to a software package being given a global API such as global API 220 to become candidate packages). Eventually, one of the queen bee candidates is selected and becomes the queen (analogous to becoming the independent package). Likewise, some modular software packages may designed to be a dependent package, some modular software packages may be designed to be an independent package, some modular software packages are designed to become either a dependent or an independent modular software package, and then, in runtime of an application, the identity of the one independent modular software package is determined.

FIG. 10 depicts a flowchart for a runtime process for a fallback function in an application with globalized modular software packages in accordance with an illustrative embodiment. Process 1000 starts. A determination is made whether there is a match between the runtime dependent message key and the dependent message key in the desired language resource file (step 1004). If there is a match between the runtime dependent message key and the dependent message key in the desired language resource file, the dependent text string is replaced with the desired language text string associated with the resource message key (Step 1004) and process 1000 ends. If there is no match between the runtime dependent message key and the dependent message key in the desired language resource file, then a determination is made whether there is a match between the runtime dependent message key and the default language text string associated with the resource message key (step 1008). If there is a match between the runtime dependent message key and the default language text string associated with the resource message key, the dependent text string is replaced with a default language text string associated with the resource message key (step 1010) and process 1000 ends. If there is no match between the runtime dependent message key and the default language text string associated with the resource message key, then the dependent text string is loaded (step 1012) and process 1000 ends.

FIG. 11 depicts a flowchart for a process to perform exhaustive extraction in accordance with an illustrative embodiment. As used herein a non-globalized text string is one that has not been extracted, translated, and stored in the resource file of a package. Process 1100 starts. A determination is made whether a non-globalized text string has been identified (step 1102). If a non-globalized text string has been identified, the non-globalized text string is stored in a non-globalized resource file. (step 1104). If regular extraction has been performed, then the non-globalized resource file would be placed in the package from which it was extracted and it would not matter if the package was a dependent package or an independent package. If deep-extraction has been performed, then the non-globalized resource file would be placed in the independent package even if the non-globalized text was extracted from a dependent package.

Thus, illustrative embodiments of the present invention provide a computer implemented method, computer system, and computer program product for globalizing distributed software packages using a global API is disclosed. A text string in a source language is extracted from an independent package source code. An algorithm is used to calculate a resource message key for the text string. The resource message key and the text string are stored in a source language resource file. The text string is translated into an additional language to create a translated text string. The translated text string is stored with the resource message key in an additional language resource file. The independent package is distributed with the source language resource file, the additional language resource file, and the independent package program code bundled in the independent package.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for globalizing distributed software packages using a global application programming interface (API), the method comprising:
    parsing, by a computer, a dependency tree of application packages of an application;
    identifying, by the computer, a dependent package;
    extracting, by the computer, a dependent package text string in a source language from dependent package program code of the dependent package;
    calculating, by the computer using an algorithm, a dependent resource message key for the extracted dependent package text string from content of the extracted dependent package text string;
    storing, by the computer, the dependent resource message key and the extracted dependent package text string in a dependent package source language resource file;
    translating, by the computer, the extracted dependent package text string into an additional language to create a translated dependent package text string;
    storing, by the computer, the translated dependent package text string and the dependent resource message key in a dependent package additional language resource file; and
    distributing, by the computer, the dependent package with the dependent package source language resource file and the dependent package additional language resource file.

2. The method of claim 1, further comprising:
    loading, by the computer, the dependent package program code, the dependent package source language resource file, and the dependent package additional language resource file into a memory at runtime;
    calculating, by the computer using the algorithm, a runtime message key for the extracted dependent package text string in the dependent package program code from content of the extracted dependent package text string;
    determining, by the computer at runtime, that a desired language is the additional language;
    determining, by the computer, whether a match exists between the runtime message key and the dependent resource message key; and
    responsive to determining that the match exists, replacing, by the computer, the extracted dependent package text string with the translated dependent package text string.

3. The method of claim 1, further comprising:
    responsive to loading an independent package at runtime, identifying, by the computer, a default language; and
    loading, by the computer, dependent resource files from no dependent packages; or
    loading, by the computer, dependent resource files from all dependent packages and overriding a resource file loaded from the independent package; or
    selectively allowing, by the computer, one or more dependent packages to load one or more dependent package resources files; or
    selectively disallowing, by the computer, one or more dependent packages to load one or more dependent package resource files.

4. The method of claim 1, wherein a fallback routine comprises:
    at runtime, responsive to finding no match between a runtime dependent message key and the dependent resource message key, replacing, by the computer, the extracted dependent package text string with a default language text string associated with the dependent resource message key; or
    at runtime, responsive to finding no match between the runtime dependent message key and the dependent resource message key, and responsive to finding no match in the default language text string associated with the dependent resource message key, loading, by the computer, the extracted dependent package text string.

5. A computer system for globalizing distributed software packages using a global application programming interface (API), the computer system comprising:
    a bus system;
    a storage device connected to the bus system, wherein the storage device stores program instructions; and
    a processor connected to the bus system, wherein the processor executes the program instructions to parse a dependency tree of application packages of an application; to identify a dependent package; to extract a dependent package text string in a source language from dependent package program code of the dependent package; to calculate, using an algorithm, a dependent resource message key for the extracted dependent package text string from content of the extracted dependent package text string; to store the dependent resource message key and the extracted dependent package text string in a dependent package source language resource file; to translate the extracted dependent package text string into an additional language to create a translated dependent package text string; to store the translated dependent package text string and the dependent resource message key in a dependent package additional language resource file; and to distribute the dependent package with the dependent package source language resource file and the dependent package additional language resource file.

6. The computer system of claim 5, wherein the processor further executes the program instructions to load the dependent package program code, the dependent package source language resource file, and the dependent package additional language resource file into a memory at runtime; to calculate a runtime message key for the extracted dependent package text string in the dependent package program code from content of the extracted dependent package text string; to determine, at runtime, that a desired language is the additional language; to determine whether a match exists between the runtime message key and the dependent resource message key; and, responsive to determining that the match exists, to replace the extracted dependent package text string with the translated dependent package text string.

7. The computer system of claim 5, wherein the processor further executes the program instructions, responsive to loading an independent package at runtime, to identify a default language; and to load dependent resource files from no dependent packages; or to load dependent resource files from all dependent packages and to override a resource file loaded from the independent package; or to selectively allow one or more dependent packages to load one or more dependent package resources files; or to selectively disallow one or more dependent packages to load one or more dependent package resource files.

8. A computer program product for globalizing distributed software packages using a global application programming interface (API), the computer program product comprising a computer readable storage medium storing program instructions executable by a computer to cause the computer to perform steps of:

parsing, by a computer, a dependency tree of application packages of an application;

identifying, by the computer, a dependent package;

extracting, by the computer, a dependent package text string in a source language from dependent package program code of the dependent package;

calculating, by the computer using an algorithm, a dependent resource message key for the extracted dependent package text string from content of the extracted dependent package text string;

storing, by the computer, the dependent resource message key and the extracted dependent package text string in a dependent package source language resource file;

translating, by the computer, the extracted dependent package text string into an additional language to create a translated dependent package text string;

storing, by the computer, the translated dependent package text string and the dependent resource message key in a dependent package additional language resource file; and distributing, by the computer, the dependent package with the dependent package source language resource file and the dependent package additional language resource file.

9. The computer program product of claim 8, further comprising program instructions executable by the computer to cause the computer to perform steps of:

loading, by the computer, the dependent package program code, the dependent package source language resource file, and the dependent package additional language resource file into a memory at runtime;

calculating, by the computer using the algorithm, a runtime message key for the extracted dependent package text string in the dependent package program code from content of the extracted dependent package text string;

determining, by the computer at runtime, that a desired language is the additional language;

determining, by the computer, whether a match exists between the runtime message key and the dependent resource message key; and responsive to determining that the match exists, replacing, by the computer, the extracted dependent package text string with the translated dependent package text string.

10. The computer program product of claim 8, further comprising program instructions executable by the computer to cause the computer to perform steps of:

responsive to loading an independent package at runtime, identifying, by the computer, a default language; and loading, by the computer, dependent resource files from no dependent packages; or loading, by the computer, dependent resource files from all dependent packages and overriding a resource file loaded from the independent package; or selectively allowing, by the computer, one or more dependent packages to load one or more dependent package resources files; or selectively disallowing, by the computer, one or more dependent packages to load one or more dependent package resource files.

\* \* \* \* \*